S. E. HARTWELL.
Hand Seeder.
No. 23,919.
Patented May 10. 1859.
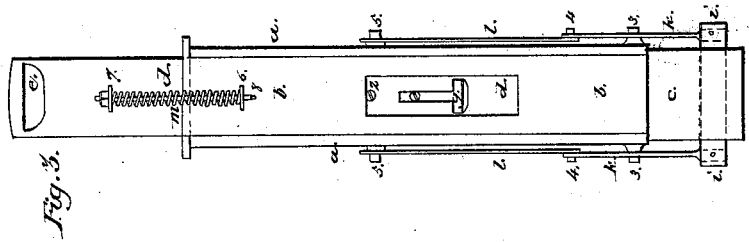
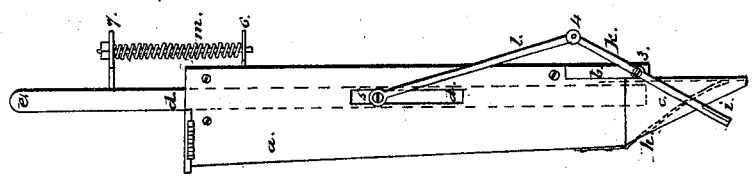
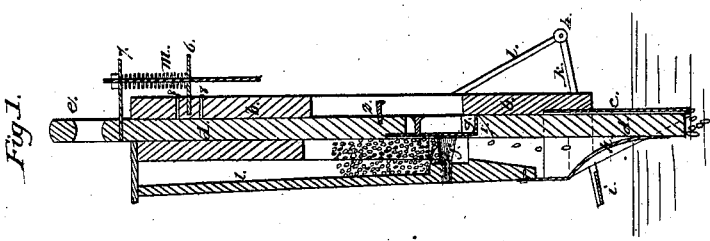

UNITED STATES PATENT OFFICE.

SAMUEL E. HARTWELL, OF NEW YORK, N. Y.

IMPROVEMENT IN CORN-PLANTERS.

Specification forming part of Letters Patent No. 23,919, dated May 10, 1859.

*To all whom it may concern:*

Be it known that I, SAMUEL E. HARTWELL, of the city and State of New York, have invented, made, and applied to use certain new and useful Improvements in Hand Corn-Planters; and I do hereby declare that the following is a full, clear, and exact description of the construction and operation of the same, reference being had to the annexed drawings, making part of this specification, wherein—

Figure 1 is a vertical section of my improved planter as inserted in the ground. Fig. 2 is a side view, and Fig. 3 is a back view, of my said invention.

Similar marks of reference indicate the same parts.

Several corn-planters have heretofore been devised in which the operator, by the insertion of the lower end of said planter in the ground, introduces and plants the required number of corns in each hill. My invention relates to this character of planter; and it consists in an arrangement of spade, planting, dropping, and covering devices, whereby the corns are dropped, planted, and covered by means that receive motion from pressing down and then lifting the apparatus.

In the drawings, *a* is the front and sides of a box containing the corn or seed to be planted. *b* is the back of said box, terminating at its lower end with a metal spade, *c*, having tapering sides.

*d* is a slide within the box *a b*, terminating with a handle, *e*, at the upper end and moving within the spade *c* at the lower end.

*f* is a brush to support the corns and only allow a given number to remain in the cavity 1 of the slide *d*.

*g* is an adjustable plate, by which the opening or cavity 1 is regulated.

*h* is a springing cap-plate passing between the sides of the spade *c*.

*m* is a helical spring between the projection 7 from the handle and slide *d* and another projection or changeable eye, 6, by the moving of which in the holes 8 8 the power of said spring is regulated to determine the depth for planting.

The operation is as follows: The party using the planter takes the handle *e*, and the weight of the box *a b* hangs by the screw 2 in the slide *d*. On resting the spade *c* on the ground the weight of the box and power of the spring *m* cause the same to penetrate the required depth as the slide *d* is forced down. The first operation does not plant any corn; but the cavity 1, descending below the brush *f*, carries the proper number of seeds, that drop out onto the spring cap-plate *h* against the side of the slide *d*, when, on lifting the slide *d*, the spring-plate touches against the inside of the spade *c* and the corns are immediately below the end of the slide *d*, when, on again entering the planter in the ground, the corns are planted by the end of the slide *d*, acting in conjunction with the spade *c* and spring-plate *h*, and the cavity 1 conveying the necessary number of corns out of the box, they drop ready for the next hill. Thus the simple insertion of the shoe *c* in the ground once plants the corns and places other corns ready for the next planting.

The device for covering the corns consists of a hoe, *i*, on arm, *k*, having their fulcra 3 on the lower end of the back piece, *b*. *l l* are links, jointed at 4 to the arms *k* and at 5 to the sides of the slide *d*, slots being provided in the sides of the box *a* for the motion of the pins 5 with said slide *d*. When the instrument is out of the ground, the hoe *i* is in the position shown in Figs. 2 and 3, and when the spade *c* is inserted the arms *k* have been turned down into the position of Fig. 1, so that as the slide *d* is raised preparatory to lifting the instrument, the hoe *i* acts on the earth and thoroughly covers the corn that has been planted.

What I claim as my invention, and desire to secure by Letters Patent, is—

The arrangement of the slide *d*, shoe *c*, and hoe *i*, connected and acting in the manner and for the purposes substantially as specified.

In witness whereof I have hereunto set my signature this 5th day of February, 1859.

S. E. HARTWELL.

Witnesses:
    CHAS. H. SMITH,
    THOMAS G. HAROLD.